Oct. 7, 1924. 1,510,755
A. E. WEIR ET AL
LOCKING DEVICE FOR TRAIN LINE COUPLINGS
Filed June 19, 1923 2 Sheets-Sheet 1
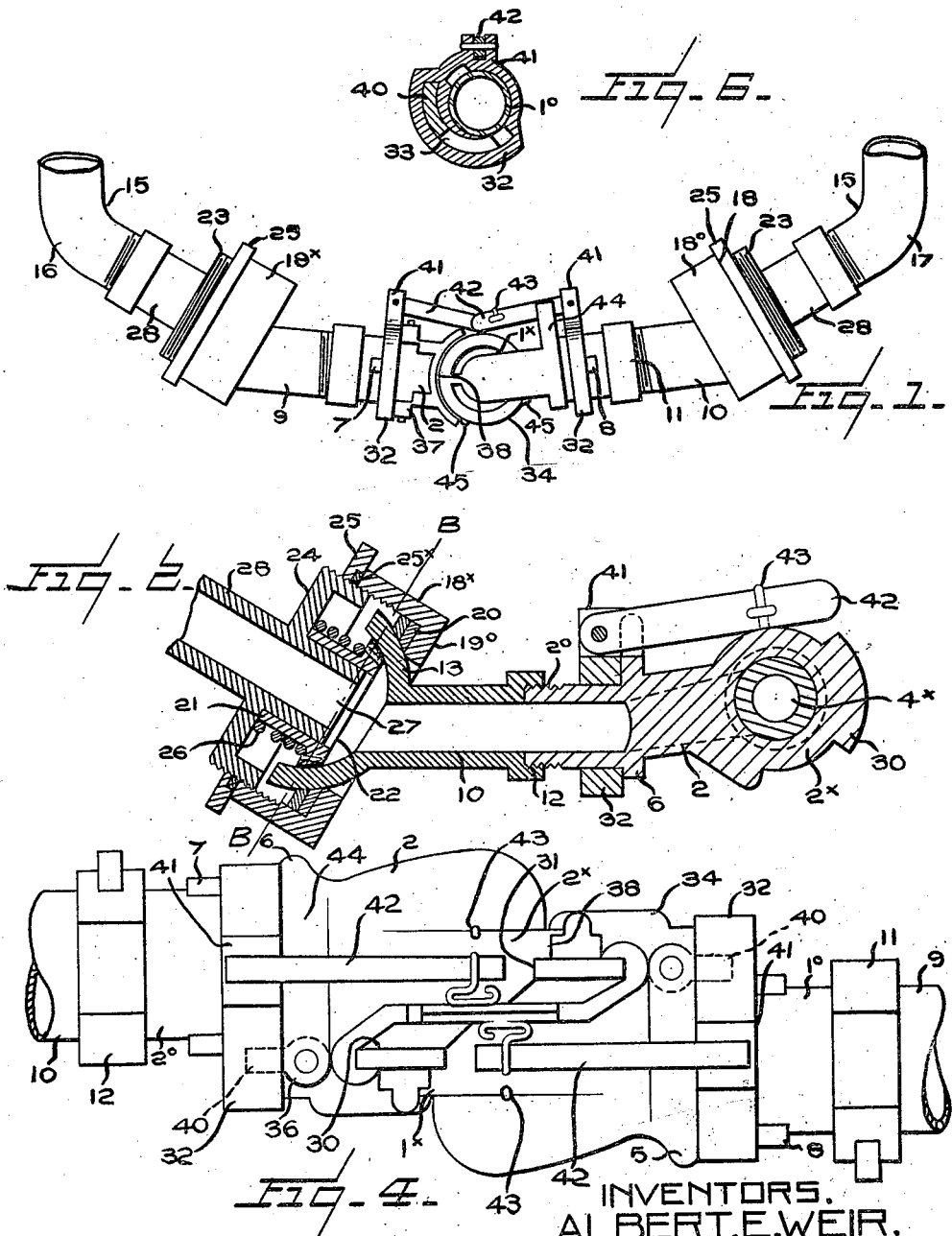
INVENTORS.
ALBERT.E.WEIR.
GEORGE.WATSON.
By Fetherstonhaugh & Co.
ATTYS.

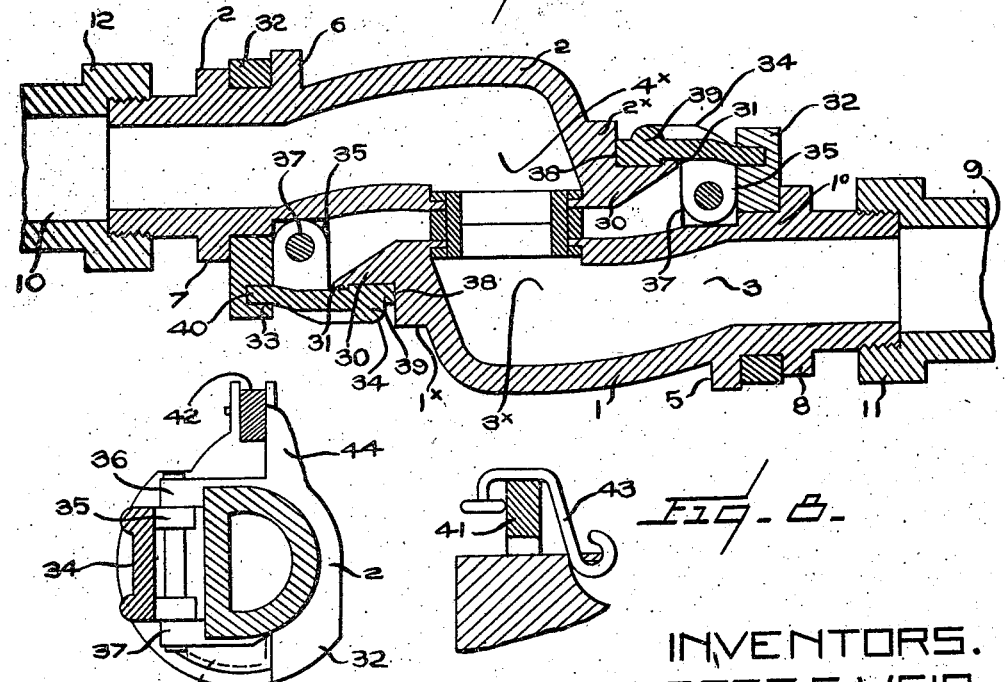

Patented Oct. 7, 1924.

1,510,755

UNITED STATES PATENT OFFICE.

ALBERT EDWARD WEIR AND GEORGE WATSON, OF TORONTO, ONTARIO, CANADA.

LOCKING DEVICE FOR TRAIN-LINE COUPLINGS.

Application filed June 19, 1923. Serial No. 646,364.

*To all whom it may concern:*

Be it known that we, ALBERT EDWARD WEIR and GEORGE WATSON, of the city of Toronto, in the county of York, in the Province of Ontario, Canada, have jointly invented certain new and useful Improvements in Locking Devices for Train-Line Couplings, of which the following is the specification.

Our invention relates to improvements in locking devices for train line couplings and the object of the invention is to devise a locking device for couplings for air or steam lines particularly adaptable to railway rolling stock and such as will not deteriorate by exposure to weather conditions and which will ensure of a tight joint being maintained under all circumstances.

Fig. 1 is a side elevation of our coupling connection.

Fig. 2 is an enlarged longitudinal section through one member of the coupling.

Fig. 3 is a sectional view on line B—B, Fig. 2.

Fig. 4 is a plan view showing the coupling heads interlocked.

Fig. 5 is a plan sectional view through Fig. 4.

Fig. 6 is a cross sectional view on line 6—6, Fig. 4.

Fig. 7 is a cross sectional view on line 7—7, Fig. 4.

Fig. 8 is a sectional detail showing the coupling head lever safety catch.

In the drawings like characters of reference indicate corresponding parts in each figure.

1 and 2 indicate the coupling heads of the two members of a coupling particularly adaptable for use as an air line coupling.

The heads 1 and 2 are formed by the heads proper $1^x$ and $2^x$ having laterally directed opposing openings $3^x$ and $4^x$ (see Fig. 5) opposing one another and adapted to register and necks 1° and 2° extending from each head forming ducts 3 and 4 extending longitudinally in opposite directions.

The necks 1° and 2° are provided with projections 7 and 8 spaced from the flanges 5 and 6 of the two necks 1° and 2° for a purpose which will hereinafter appear.

9 and 10 are pipe sections provided with internally threaded nut ends 11 and 12 into which are secured the outer ends of the necks 1° and 2°. Each pipe section 9 and 10 is provided with a semi-spherical socket 13 (see Fig. 3).

16 and 17 are pipe sections which are bent into slightly angular form intermediately of their length as indicated at 15.

18, $18^x$, 19 and $19^x$ are flexible joints. Each joint comprises a cylindrical member 18° forming a casing in which is located a flexible joint connecting the pipe sections 10 and 16 together and 9 and 17 together. Each casing is provided with an internal thread and with an inwardly extending annular flange 19°, the inner end edge of which is formed concentric with the centre of the spherical socket member 13 so as to fit and be turnable thereon.

20 is an annular packing of any suitable material inserted between the flange 19° and the socket 13. 21 is a sleeve. 22 is an annular flange formed integral with the sleeve, the edge of which is curved to form a spherical segment fitting within the interior of the member 13. 23 is a cylindrical member provided with a head 24. The member 23 is provided with an external thread adapted to be screwed into the internal thread of the cylindrical member 18, $18^x$, 19 or $19^x$ thereby forming an enclosing casing for the flexible joint.

25 is a locking ring which is screwed onto the external thread of the member 23 against the end of the member 18 or member $18^x$, 19 or $19^x$. The ring 25 is right angular in cross section to receive a packing ring $25^x$. 26 is a compression spring bearing at one end against the head of the member 23 and at the opposite end against the flange 22. The flange 22 is provided with perforations $21^x$ for a purpose which will hereinafter appear.

27 is a tubular portion which extends inward from the centre of the head 24 and on which the sleeve 21 slidably fits. 28 is a neck which extends outward from the head 24 in axial alignment with the portion 27. The necks 28 of the joints 18 and $18^x$ terminate at their outer end in internally threaded portions 29 into which the ends of the pipe sections 16 and 17 are secured.

The opposite ends of the pipe sections 16 and 17 are similarly secured in the neck portions 14° of the flexible joints 19 and $19^x$ corresponding to the portions 10 of the joints 18 and $18^x$.

We will now describe the means by which the coupling heads 1 and 2 are connected and locked together.

Each head proper 1× and 2× is provided with a segmental flange 30. Each flange 30 is provided on its inner face with an arc-shaped rib 31. 32 is a cam member. The cam member 32 is mounted on each neck 1° and 2° between the projections 7 and 8 and the flanges 5 and 6. The cam members 32 are each provided with eccentric cam grooves 33. 34 is a locking lever which is L-shape in form, the short arms 35 being pivotally mounted between lugs 36 and 37 extending from the neck of the corresponding head. The other arm of the lever extends normally longitudinally of the head when in the locking position and is provided at its end with an arc-shaped recess 38 around which extends an inwardly projecting rib 39 adapted to fit within the rib 31 of the flange 30. The lever 34 is provided with a tail piece 40 which extends into the cam groove 33 of the cam 32. The cam member 32 is provided with lugs 41 between which is swung an operating lever 42. 43 is a catch adapted to engage the lever 42 and hold it in the locking position so as to bear against the stop projections 44 which limits its rotary or turning movement.

45 is a projection (see Fig. 1) which extends outward from each member of the head so that when the coupling is connected the projections extend from one member beneath the other member so as to support and insure that the members are brought into proper position so that the orifices 3× and 4× are in a line.

When separating the coupling all it is necessary to do is to spring the catches 43 out of engagement with the levers 42 thereby freeing the levers 42 which are then swung upward to a vertical position to clear the projections 44. The levers 42 are then swung laterally so as to turn the cam members 32 around the necks 1° and 2° thereby carrying the cam grooves 33 so that the portions of each of the cam grooves of least radius are brought into position to force the tail piece 40 slightly inward to carry the rib portions 39 of the locking levers 34 out of engagement with the ribs 31 of the flanges 30. The members of the coupling may then be separated apart.

To connect the coupling members together the reverse of this operation takes place.

The joints 18, 18×, 19 and 19× render the device flexible so that as the engine or coach draws apart or together with the next adjacent coach the line coupling above described assumes a more or less horizontal position or sags downward in a generally curved direction as indicated in the drawing.

Also these joints take care of any up and down movement between the parts. The air as it passes through each joint 18, 18×, 19 and 19× also passes through the perforations 21× so that the air pressure is exterted on each side of the flange 22 to equalize the pressure and thereby prevent any binding between the outer periphery of such flange and the cup socket 13. The spring 26 serves to exert a slight extra pressure upon one side of the flange to hold it in contact with the inner periphery of the cup.

From this description it will be seen that we have devised a very simple construction of locking device for train line couplings which will not deteriorate when subject to weather conditions.

By our device no appreciable deterioration takes place. A maximum air pressure can always be employed and a fluid-tight and flexible connection made between the members and the train line.

What we claim as our invention is:

In a locking device for train line couplings, a pair of coupling heads having laterally directed registering orifices, a segmental flange extending outward longitudinally of each head and having an outwardly directed edge rib, a locking lever swung upon each opposing coupling member and having a rib connecting the aforesaid rib, a tail piece extending from the locking lever, a cam member rotatable around each coupling head and having an eccentric cam groove, a cam operating lever, and means for locking the lever to the coupling when swung to a position parallel thereto.

ALBERT EDWARD WEIR.
GEORGE WATSON.